US010189958B2

(12) United States Patent
Brennan et al.

(10) Patent No.: US 10,189,958 B2
(45) Date of Patent: Jan. 29, 2019

(54) ORGANIC POLYMERIC PARTICLES, PAPER COATING COMPOSITIONS AND METHODS

(71) Applicant: OMNOVA Solutions Inc., Beachwood, OH (US)

(72) Inventors: David J. Brennan, Midland, MI (US); John P. Kelly, Midland, MI (US); Brian J. Ninness, Midland, MI (US); James G. Galloway, Midland, MI (US); Alan B. Chaput, Jr., Midland, MI (US); John A. Roper, III, Midland, MI (US); John D. Oates, Midland, MI (US)

(73) Assignee: OMNOVA Solutions, Inc., Beachwood, OH (US)

(*) Notice: Subject to any disclaimer, the term of this patent is extended or adjusted under 35 U.S.C. 154(b) by 0 days.

(21) Appl. No.: 15/791,558

(22) Filed: Oct. 24, 2017

(65) Prior Publication Data

US 2018/0072854 A1 Mar. 15, 2018

Related U.S. Application Data

(63) Continuation of application No. 14/943,321, filed on Nov. 17, 2015, which is a continuation of application
(Continued)

(51) Int. Cl.
*D21H 21/54* (2006.01)
*C08J 3/12* (2006.01)
(Continued)

(52) U.S. Cl.
CPC ............ *C08J 3/126* (2013.01); *C08F 212/08* (2013.01); *C08F 265/02* (2013.01);
(Continued)

(58) Field of Classification Search
CPC ...... C08F 265/00; D21H 21/54; D21H 19/22; C08J 3/126
See application file for complete search history.

(56) References Cited

U.S. PATENT DOCUMENTS 5,157,084 A     10/1992   Lee
5,521,253 A *   5/1996   Lee .......................... B01J 13/14
                                                                     525/301
(Continued)

FOREIGN PATENT DOCUMENTS

EP     0 022 633 A2    1/1981
EP     0 426 391 A2    5/1991
(Continued)

*Primary Examiner* — Kara B Boyle
(74) *Attorney, Agent, or Firm* — Arthur M. Reginelli; David G. Burleson

(57) ABSTRACT

A method of forming an organic polymeric particle, comprising (i) forming a core of an organic hydrophilic polymer with monomers that contains an acid group, a latent acid group, or a combination thereof; (ii) forming a shell that comprises an organic polymer with monomers that contains an acid group, a latent acid group, or a combination thereof to encapsulate the core, where the shell has an initial size; expanding the core to form a hollow porous structure from the shell, where the hollow porous structure has an expanded size larger than an initial size of the shell; and (iii) hydrolyzing the acid group, the latent acid group or the combination thereof of the hollow porous structure and the organic hydrophilic polymer to give the organic polymeric particle a void volume fraction of 40 percent to 85 percent.

7 Claims, 8 Drawing Sheets

Related U.S. Application Data

No. 14/541,776, filed on Nov. 14, 2014, which is a continuation of application No. 13/264,521, filed as application No. PCT/US2010/000978 on Apr. 1, 2010.

(60) Provisional application No. 61/214,093, filed on Apr. 20, 2009, provisional application No. 61/212,638, filed on Apr. 14, 2009.

(51) Int. Cl.

| | | |
|---|---|---|
| *C08F 265/02* | (2006.01) | |
| *C08F 265/04* | (2006.01) | |
| *C08J 9/00* | (2006.01) | |
| *C08J 9/18* | (2006.01) | |
| *C09D 151/00* | (2006.01) | |
| *D21H 19/42* | (2006.01) | |
| *C08J 9/26* | (2006.01) | |
| *D21H 19/22* | (2006.01) | |
| *C08J 9/224* | (2006.01) | |
| *D21H 19/20* | (2006.01) | |
| *C08F 212/08* | (2006.01) | |

(52) U.S. Cl.
CPC ............... *C08F 265/04* (2013.01); *C08J 3/12* (2013.01); *C08J 9/0061* (2013.01); *C08J 9/18* (2013.01); *C08J 9/224* (2013.01); *C08J 9/26* (2013.01); *C09D 151/003* (2013.01); *D21H 19/20* (2013.01); *D21H 19/22* (2013.01); *D21H 19/42* (2013.01); *D21H 21/54* (2013.01); *C08J 2325/14* (2013.01); *C08J 2333/02* (2013.01); *C08J 2333/08* (2013.01); *C08J 2333/12* (2013.01); *C08J 2425/00* (2013.01); *C08J 2425/08* (2013.01); *C08J 2433/00* (2013.01); *Y10T 428/2982* (2015.01); *Y10T 428/2989* (2015.01)

(56) References Cited

U.S. PATENT DOCUMENTS

| | | |
|---|---|---|
| 7,192,542 B2 | 3/2007 | Ugazio |
| 2008/0041544 A1 | 2/2008 | Tsavalas et al. |
| 2008/0081175 A1* | 4/2008 | Mukkamala ........... D21H 21/54 428/317.3 |
| 2008/0311416 A1* | 12/2008 | Kelly ..................... D21H 21/54 428/537.5 |
| 2010/0136356 A1 | 6/2010 | Kelly et al. |
| 2012/0136078 A1 | 5/2012 | Brennan et al. |
| 2015/0072147 A1 | 3/2015 | Brennan et al. |
| 2016/0068640 A1 | 3/2016 | Brennan et al. |

FOREIGN PATENT DOCUMENTS

| | | |
|---|---|---|
| EP | 0 467 646 A2 | 1/1992 |
| EP | 0 565 244 A1 | 10/1993 |
| EP | 0 842 992 A2 | 5/1998 |
| EP | 1 325 936 A1 | 7/2003 |
| EP | 1 440 997 A1 | 7/2004 |
| WO | 2008126521 A1 | 10/2008 |
| WO | 2010120344 A1 | 10/2010 |

* cited by examiner

ORGANIC POLYMERIC PARTICLES, PAPER COATING COMPOSITIONS AND METHODS

CROSS REFERENCE TO RELATED APPLICATIONS

The present application is a continuation application of U.S. Non-Provisional Ser. No. 14/943,321 filed on Nov. 17, 2015, which claims the benefit of U.S. Non-Provisional Ser. No. 14/541,776 filed on Oct. 14, 2014, U.S. Non-Provisional Ser. No. 13/264,521 (abandoned), filed on Jan. 27, 2012, which is a National-Stage application of International Application Serial No. PCT/US2010/000978 filed on Apr. 1, 2010, and claims priority to U.S. Provisional Application Ser. No. 61/214,093 filed on Apr. 20, 2009, and 61/212,638 filed on Apr. 14, 2009, all of which are incorporated herein by reference.

FIELD OF THE DISCLOSURE

The disclosure relates to organic polymeric particles, paper coating compositions that contain the organic polymeric particles, coated paper and/or paperboard formed with the paper coating compositions, methods of forming the organic polymeric particles, and methods of producing the coated paper and/or paperboard with the paper coating compositions.

BACKGROUND

The appearance of printed text and/or images on paper can be affected by the presence of a coating on the paper. The coating can contain a mixture of clay, pigment, and binder. When ink is applied to an uncoated paper it is absorbed by the paper. When ink is applied to coated paper it sits on the coating. This attribute allows ink printed on coated paper to retain a crisp edge. As a result, coated paper generally produces sharper, brighter images and has better reflectivity than uncoated paper.

Most absorbent material swells upon uptake of water giving them poor rheological performance in coating applications. In addition, most water swollen pigmented coatings shrink upon drying resulting in low gloss measurements. Rigid water absorbent materials circumvent the shrinkage but usually fail to provide glossy coatings upon calendering. Currently, high gloss ink jet coated paper is produced using expensive alternative coating technology such as cast coating. Ink-jet receptive coatings have been based on two technologies—swellable polymeric layers and microporous layers. As the speed of ink-jet printers has increased, the need for quick drying coatings has all but eliminated the use of swellable polymeric coatings. As ink-jet technology advances and begins to make inroads into the commercial and graphic arts arenas, the demand put on the microporous coating media will only intensify.

Microporous coating layers are currently formulated from silica and alumina pigments, a binder, and various functional additives. The primary objective of these receptive layers is to generate a maximum amount of fine pores near the surface in order to aid in quickly absorbing the ink. These coatings generate a porous structure that, in addition to facilitating rapid fluid absorption, also provide the necessary volumetric capacity to handle the high levels of ink applied to the sheet. Amorphous silica, in its many forms, is the predominate pigment used for microporous coatings. For matte-finished coatings silica gel has been the pigment of choice. Silica gel pigments for matte applications are typically in the 1-10 µm range of particle size. The high internal porosity of silica gels (up to 2.0 cm3/g), along with their nanometer-sized pores provide the driving force for liquid uptake.

Glossy coatings require the use of particles in the nanometer size range. Non-porous colloidal silica and fumed silica have been used with success in producing glossy, microporous coatings. Colloidal silica is a dispersion of non-porous silica particles in water. These primary, dense phase particles can range in size from 10 nm to over 100 nm. The porosity of coatings based on colloidal silica is due to the packing structure of the particles. Fumed silica is produced by the flame hydrolysis of $SiCl_4$, and generates small primary particles in the range of 7 to 40 nm. These primary particles stick together via hydrogen bonding into micron sized aggregates. The porosity of ink-jet coatings based on fumed silica is due to the porous structure created by primary particles associating into secondary structures.

In addition to the small particle size silicas, fumed alumina is another pigment commonly used in the production of glossy inkjet papers. Alumina has the distinct advantage of being cationic at neutral pH, which provides a means of segregating anionic dyes and pigments from the ink near the coating surface. This inherent property of alumina may reduce the need for cationic fixatives in the coating formulation.

While silica and alumina pigments are effective once they have been applied to the substrate, they do pose production problems that limit their use to relatively slow coating speeds. The coating solids level is a limiting factor when using silica pigments due to rheology and water holding issues. The high water content of silica-based coatings create a high drying demand, which, taken with the rheological difficulties of these dispersions, limits their use to slow off-machine coaters. In addition, high gloss grades require special coating conditions such as cast coating.

Therefore, there exists a need to reduce the costs associated with the production of ink jet receptive coated paper from both the raw materials and the coating application viewpoint. Silica and alumina pigments are expensive in relation to other pigments used in commercial printing (e.g., $CaCO_3$ and kaolin), and there has been efforts to provide the industry with ink-jet optimized versions of these pigments. The major opportunity to decrease the cost associated with high quality, ink-jet papers is the opportunity to produce these grades on-machine with existing capabilities. A novel, high-glossing pigment that provides the rapid adsorption associated with silica pigments but is able to be coated at conventional high machine speeds would facilitate this opportunity tremendously.

As such, improvements in producing the different grades of coated paper and the coating compositions used to form the coated paper continues to be a desire in the art.

SUMMARY

The present disclosure provides embodiments of an organic polymeric particle, paper coating compositions that contain the organic polymeric particle, coated paper and/or paperboard formed with the paper coating compositions, methods of forming the organic polymeric particle, and methods of producing the coated paper and/or paperboard with the paper coating compositions. Embodiments of the organic polymeric particle are water absorbent and responsive to calendering, as discussed herein.

As discussed herein, embodiments of the organic polymeric particle include an organic hydrophilic polymer with a unit for hydrogen bonding and a hollow porous structure of an organic polymer that at least partially surrounds the organic hydrophilic polymer, where the hollow porous structure has a pore surface area greater than 1 percent of a total theoretical exterior surface area and the organic hydrophilic polymer and the hollow porous structure give the organic polymeric particle a void volume fraction in a range of 40 percent to 85 percent.

As discussed herein, the organic polymeric particles of the present disclosure are highly water absorbent while retaining the ability to provide enhanced gloss upon calendering, the ability to be high speed coated, and also to replace inorganic, water-absorbing particles currently used in coated paper for ink-jet and fileographic printing.

Embodiments of the present disclosure also include a method of forming the organic polymeric particle including forming a core of an organic hydrophilic polymer with monomers that contain an acid group, a latent acid group, or a combination thereof and forming a shell that comprises an organic polymer with monomers that contains an acid group, a latent acid group, or a combination thereof to encapsulate the core, where the shell has an initial size. The method also includes expanding the core to form a hollow porous structure from the shell, where the hollow porous structure has an expanded size larger than the initial size of the shell. This forms the hollow porous structure of the organic polymeric particle, where hydrolyzing the acid group, the latent acid group, or the combination thereof of the hollow porous structure and the organic hydrophilic polymer gives the organic polymeric particle a void volume fraction of 40 percent to 85 percent.

Embodiments of the present disclosure further include a coated paper. Embodiments of the coated paper have a base paper and a coating over at least one of the first and second major surfaces formed from a coating formulation having a binder and an organic polymeric particle of the present disclosure. For the various embodiments, the coating provides for an ink set off brightness value that is at least 10 percent larger at 30 seconds after printing than coatings having organic particles chosen from a group consisting of solid particles, hollow particles, and combinations thereof. In some embodiments, the coated paper further includes a cationic fixative layer. The coating formed from the paper coating composition of the present disclosure can be used as a base coat, a top coat, and/or one or more intermediate coats between a base coat and a top coat of a coated paper.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

Definitions

As used herein, "paper" refers to a base paper of an amalgamation of fibers that can include, at least in part, vegetable and/or wood fibers, such as cellulose, hemicelluloses, lignin, and/or synthetic fibers. As appreciated, other components can be included in the base paper composition of the paper. In addition, the term "paper" is meant to include both paper and/or paperboard. The paper and/or paperboard, as used herein, can differ in their thickness, strength, and/or weight, but are both intended to be modified by the embodiments of the paper coating compositions and methods provided herein to form the coated paper and/or paperboard. For improved readability, the phrase "paper and/or paperboard" is replaced herein with the term "paper", with the recognition that "paper" encompasses both paper and/or paperboard unless such a construction is clearly not intended as will be clear from the context in which this term is used.

As used herein, a "core" is a precursor to the organic hydrophilic polymer that is contained at least partially within the hollow porous structure, where the core is expanded, as discussed herein, to form the organic hydrophilic polymer. As used herein, a "shell" is a precursor to a hollow porous structure, where the shell is expanded, as discussed herein, to form the hollow porous structure. The combination of the organic hydrophilic polymer and the hollow porous structure, as provided herein, form the organic polymeric particle of the present disclosure.

As used herein, the "void volume fraction" is the volume fraction of the organic polymeric particle that is not occupied by the polymer forming the organic polymeric particle, where a theoretical volume for the particle is assumed and calculated based on its given shape (e.g., spherical, spheroid, etc).

As used herein, a "hollow porous structure" includes a wall having at least an outer surface and an inner surface relative the outer surface, where the inner surface helps to define a hollow space of the hollow particle structure in which the organic hydrophilic polymer can reside. For the various embodiments, the outer surface of the hollow porous structure helps to define the theoretical volume and/or exterior surface area of the organic polymeric particle, and pores extend between and through the inner surface and the outer surface to provide porosity to the hollow porous structure.

As used herein, the "pore surface area" is the surface area of the organic polymeric particle defined by the difference between a total theoretical exterior surface area (e.g., total theoretical exterior surface area=$4\pi r^2$ for an assumed spherical particle) and an actual exterior surface area defined by the hollow porous structure of the organic polymeric particle.

As used herein, the term "acid group" refers to a chemical compound which donates a hydrogen ion to another compound. Exemplary acid groups include, but are not limited to, acrylic acid, itaconic acid, fumaric acid, methacrylic acid, and/or an emulsion polymerizable $\alpha\beta$ unsaturated carboxylic acid.

As used herein, the term "latent acid group" refers to a chemical compound that when hydrolyzed provides an acid group. Exemplary latent acid groups include, but are not limited to, esters and nitriles.

As used herein, the term "parts" refers to parts on a dry basis, and, as used herein, parts are based on 100 parts of dry particle.

As used herein, the term "weight parts" refers to parts on a dry basis, based on weight, and, as used herein, weight parts are based on 100 weight parts of dry particle.

For the purposes of the present disclosure, the term "dry" means in the substantial absence of liquids and the term "dry basis" refers to the weight of a dry material. For example, the solids content of the organic polymeric particle is expressed as a dry weight, meaning that it is the weight of materials remaining after essentially all volatile materials have been removed.

As used herein, a "high gloss" includes a TAPPI gloss value of 65 or greater as determined at a 75° (degree) angle of reflectance.

As used herein, "surfactant" refers to an agent that can lower the interfacial tension between a polymer and water and also stabilize organic polymeric particles during the polymerization process.

As used herein, "$T_g$" is an abbreviation for glass transition temperature, which means the temperature at or above which a glassy polymer will undergo segmental motion of the polymer chain. The $T_g$ of the organic polymeric particles reported herein is measured by differential scanning calorimetry (DSC).

As used herein "psi" is an abbreviation for pressure having the unit pound per square inch, where 1 psi=6,894.76 Pa.

As used herein, the term "(meth)" indicates that the methyl substituted compound is included in the class of compounds modified by that term. For example, the term (meth)acrylic acid represents acrylic acid and methacrylic acid.

As used herein, "latex" refers to an aqueous dispersion of polymer particles (e.g., the organic polymeric particles of the present disclosure) prepared by emulsion polymerization of one or more monomers.

As used herein, an "emulsion" refers to a suspension consisting of an immiscible liquid and/or solid dispersed and held in another liquid with the aid of a surfactant.

As used herein, "emulsion polymerization" refers to a type of radical polymerization that can start with an emulsion incorporating water, monomers, and surfactant.

As used herein, "a," "an," "the," "at least one," and "one or more" are used interchangeably. The terms "comprises" and variations thereof do not have a limiting meaning where these terms appear in the description and claims. Thus, for example, a reactant mixture that comprises "a" binder can be interpreted to mean that the binder includes "one or more" binders.

The term "and/or" means one, more than one, or all of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

As used herein, the terms "over," "above," "upper," "under," "below," "lower," and the like, with respect to layers in inkjet media, refer to the order of the layers over the support, but do not necessarily indicate that the layers are immediately adjacent or that there are no intermediate layers.

As used herein, "particle size" or "average particle size" refers to, unless otherwise indicted, a volume median diameter of the organic polymer particles as determined by light scattering measurements of polymer particles dispersed in water, as measured using photon correlation spectroscopy (PCS) or MIE scattering techniques employing a NANO-TRAC (Microtac Inc.) ultrafine particle analyzer.

Unless otherwise indicated, all numbers expressing quantities of components, weight parts, percentages, and so forth used in the specification and claims can be understood as being modified by the term "about."

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Figure 1A:
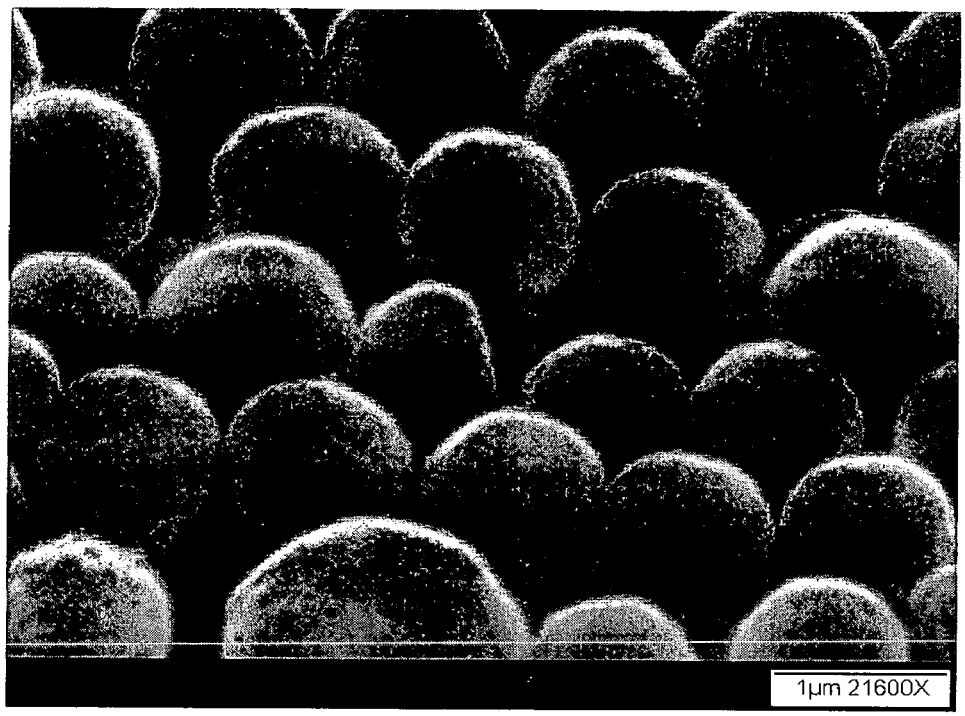
FIGS. 1A-1F are SEM images of hollow particle HS 3020 (FIG. 1A) and Organic polymeric particles 1-5 (FIGS. 1B-1F, respectively) according to the present disclosure.
Figure 1B:
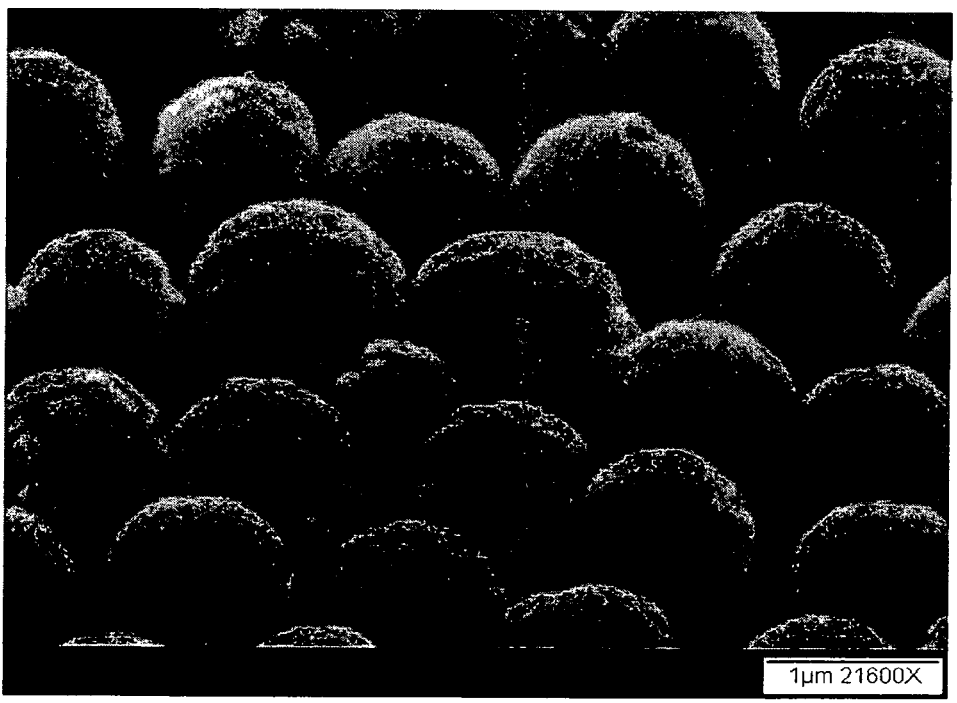
Figure 1C:
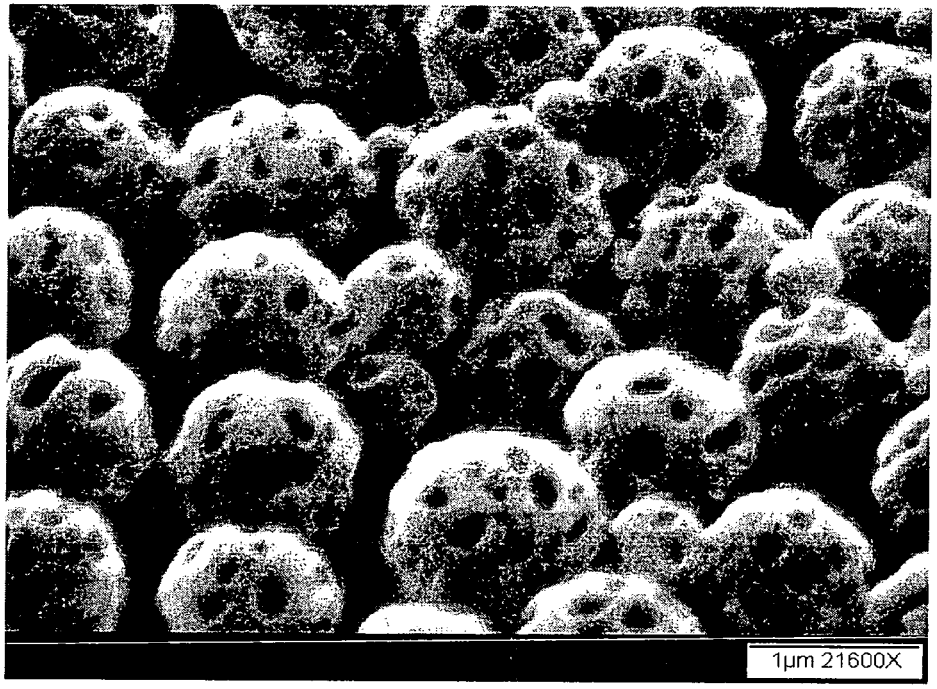
Figure 1D:
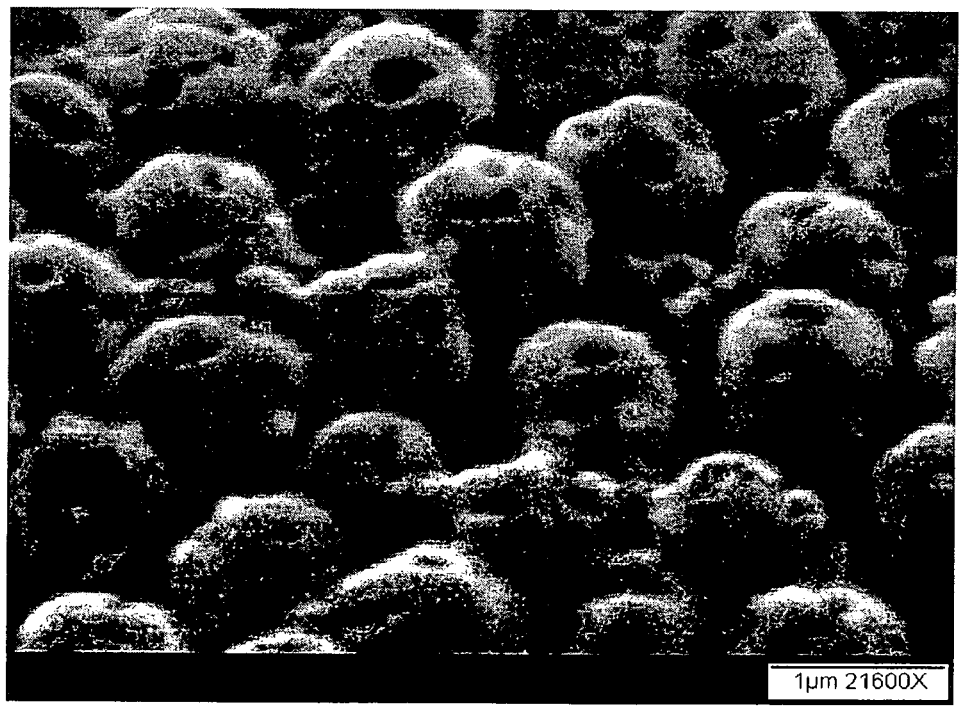
Figure 1E:
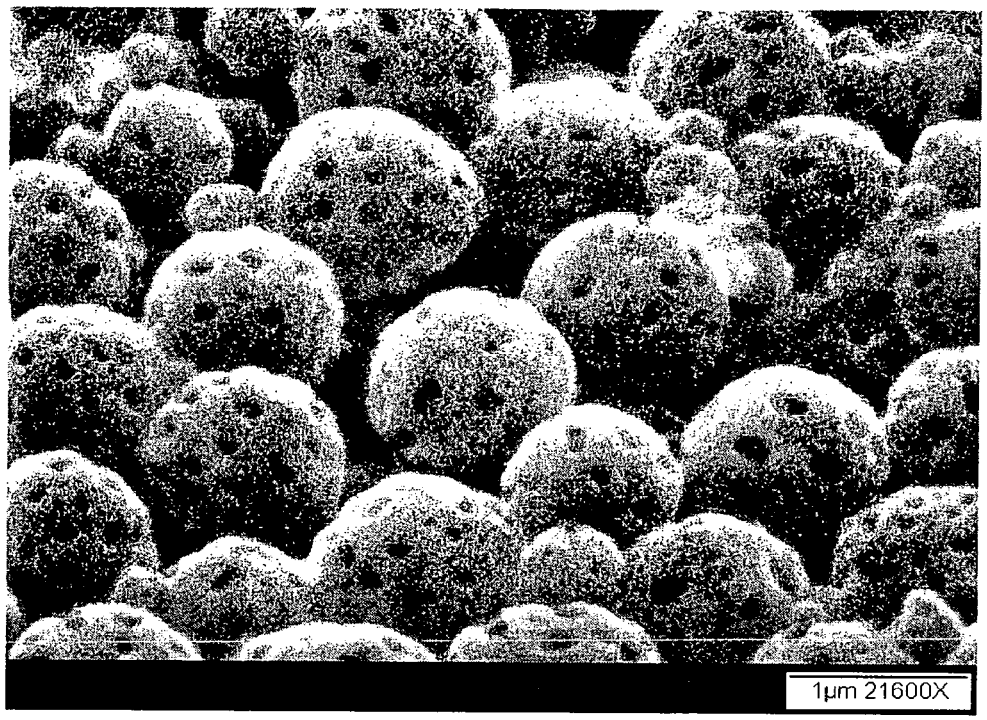
Figure 1F:

The present disclosure provides embodiments of organic polymeric particles, paper coating compositions that contain the organic polymeric particles, coated paper and/or paperboard formed with the paper coating compositions, methods of forming the organic polymeric particles, and methods of producing the coated paper and/or paperboard with the paper coating compositions. The organic polymeric particles of the present disclosure are porous, water absorbent, and responsive to calendering. By providing a organic polymeric particle that is water absorbent, coating compositions including the organic polymeric particle can be used in quick drying applications, for example, coated inkjet paper.

The organic polymeric particles of the present disclosure have an organic hydrophilic polymer with a unit for hydrogen bonding and a hollow porous structure structure. For the various embodiments, the hollow porous structure, which comprises an organic polymer, at least partially surrounds the organic hydrophilic polymer and has a pore surface area greater than 1 percent of a total theoretical exterior surface area of the hollow porous structure. In some embodiments, the hollow porous structure can have a pore surface area greater than 2 to 50 percent of the total theoretical exterior surface area of the hollow porous structure. For the various embodiments, the organic hydrophilic polymer and the hollow porous structure provide a porous structure that can give the organic polymeric particle a void volume fraction of 40 percent to 85 percent. In some embodiments, the void volume fraction of the organic polymeric particle can be in a range of 60 percent to 80 percent.

The organic polymeric particle of the present disclosure can be produced through a sequential emulsion polymerization in an aqueous medium. The term "sequentially emulsion polymerized" refers to polymers (which term includes copolymers as well as homopolymers) which are prepared in an aqueous medium by an emulsion polymerization process where the dispersed polymer particles of a preformed latex or "seed" polymer in the aqueous medium are increased in size by deposition thereof of polymerized product of one or more successive monomer charges introduced into the aqueous medium containing dispersed particles of the preformed latex in one or more subsequent stages.

The term "seed" polymer refers to an aqueous emulsion polymer dispersion which may be the initially formed dispersion that is the product of a single stage of emulsion polymerization, or it may be the emulsion polymer dispersion obtained at the end of a subsequent stage not including the final stage of the sequential polymerization. Thus, the organic hydrophilic polymer with a unit for hydrogen bonding which is herein intended to be provided with a shell by one or more subsequent stages of emulsion polymerization may itself be termed a seed polymer for the next stage wherein the shell-forming polymer is deposited on such seed polymer particles.

The organic hydrophilic polymer of the present disclosure may be the product of an aqueous emulsion polymerization of one or more hydrophilic polymers and/or monomers, where the resulting organic hydrophilic polymer contains a unit for hydrogen bonding. The unit for hydrogen bonding allows for the organic hydrophilic polymer to be hydrolyzed, dissolving portions of the organic hydrophilic polymer, and creating a porous structure from the organic hydrophilic polymer. In some embodiments, the unit for hydrogen bonding can be an ester, a carboxylic acid, a nitrile, and/or an alcohol.

In various embodiments, the organic hydrophilic polymer of the organic polymeric particle can be formed from 5 to 95 weight parts of a first monomer containing an acid group, a latent acid group, or a combination thereof. As used herein, "containing an acid group, a latent acid group, or a combination thereof" refers to a monomer that includes an acid group, a latent acid group, or both an acid group and a latent acid group. In some embodiments, the first monomer containing an acid group, a latent acid group, or a combination thereof can form a carboxylic acid group upon hydrolysis. As used herein, "hydrolysis" refers to a chemical reaction with water molecules, where the water molecules are split into hydrogen and hydroxide ions that can react with the latent acid group to form an acid group.

In embodiments where the first monomer includes an acid group, the organic hydrophilic polymer can be formed from 5 to 45 weight parts of the first monomer. In other embodiments, the organic hydrophilic polymer can be formed from 5 to 99 weight parts of a monomer with a latent acid group and 1 to 95 weight parts of a monomer with an acid group, where the latent acid group is selected from the group consisting of esters and nitriles.

Suitable acid groups included in the first monomer include, but are not limited to, acrylic acid, methacrylic acid, (meth)acryloxypropionic acid, itaconic acid, aconitic acid, maleic acid or anhydride, fumaric acid, crotonic acid, monomethyl maleate, monomethyl fumarate, monomethyl itaconate, and/or an emulsion polymerizable αβ unsaturated carboxylic acid, among others.

Suitable hydrophilic monoethylenically unsaturated monomers for making the core include vinyl acetate, acrylonitrile, (meth)acrylamide, ($C_1$-$C_{20}$) alkyl or ($C_3$-$C_{20}$) alkenyl esters of (meth)acrylic acid, such as methyl (meth) acrylate, ethyl (meth)acrylate, butyl (meth)acrylate, 2-ethylhexyl (meth)acrylate, hydroxyethyl(meth)acrylate, hydroxypropyl(meth)acrylate, benzyl (meth)acrylate, lauryl (meth)acrylate, olcyl (meth)acrylate, palmityl (meth)acrylate, steryl (meth)acrylate and the like.

The core may be obtained by the emulsion polymerization of such monomers, or by copolymerization of two or more monomers. In additional embodiments, the monomer or mixture of monomers can be copolymerized with one or more ethylenically unsaturated monomers having non-ionic character (i.e., having no ionizable group). Examples of nonionic monoethylenically unsaturated monomers include styrene, vinyltoluene, ethylene, vinyl acetate, vinyl chloride, vinylidene chloride, acrylonitrile, (meth)acrylamide, various ($C_1$-$C_{20}$)alkyl or ($C_3$-$C_{20}$)alkenyl esters of (meth)acrylic acid, where the expression (meth)acrylic acid is intended to serve as a generic expression embracing both acrylic acid and methacrylic acid.

While the core may be made in a single stage or step of the sequential emulsion polymerization and the shell may be the product of a single sequential stage or step following the core stage, nevertheless, the making of the core may involve a plurality of steps in sequence followed by the making of the shell which may involve a series of sequential steps as well.

As is common to emulsion polymerization in an aqueous medium, a water-soluble free radical initiator, such as hydrogen peroxide, tert-butyl peroxide, or an alkali metal (sodium, potassium, or lithium) or ammonium persulfate can be used in the emulsion polymerization process. The amount of initiator may be from 0.01 to 2 weight percent of the monomer charged. By performing the emulsion polymerization while maintaining low levels of emulsifier, the subsequent stages of polymer-formation deposit the most-recently formed polymer on the existing dispersed organic polymeric particles resulting from the preceding step or stage.

A nonionic or anionic emulsifier may also be used during the emulsion polymerization process, either alone or together. Examples of a nonionic type of emulsifier include tert-octylphenoxyethylpoly(39)-ethoxyethanol, and nonylphenoxyethylpoly(40)ethoxy-ethanol. Examples of anionic emulsifiers include sodium lauryl sulfate, sodium dodecyl benzene sulfonate, tertoctylphenoxyethoxypoly(39)ethoxyethyl sulfate, and sodium salt, among others.

In some embodiments, the core can be formed of a cross-linked hydrophilic polymer. In such embodiments, the cross-linked hydrophilic polymer of the core can prevent dissolution of the core when the organic polymeric particle is treated with a swellant to form the organic hydrophilic polymer, as discussed further herein.

The core, whether obtained by a single stage process or a process involving several stages, can have an average particle size, as defined herein, of 0.05 to 1.00 micron. In an additional embodiment, the core, whether obtained by a single stage process or a process involving several stages, can have an average size of 0.07 to 0.5 micron. In a further embodiment, the core, whether obtained by a single stage process or a process involving several stages, can have an average size of 0.1 to 0.4 micron.

After the core is obtained, a subsequent stage or stages of emulsion polymerization is effected to form a shell on the core. This may be performed in the same reaction vessel in which the formation of the core is accomplished or the reaction medium containing the dispersed cores may be transferred to another reaction container. It is generally unnecessary to add emulsifier unless a polymodal product is desired, but in certain monomer/emulsifier systems for forming the shell, the tendency to produce gum or coagulum in the reaction medium may be reduced or prevented by the addition of 0.05 to 0.5 weight percent, based on the shell-forming monomer weight, of emulsifier without detriment to the deposition of the polymer formed on the previously formed cores.

For the various embodiments, the shell, and the hollow porous structure formed from the shell, can be formed of an organic polymer. The monomers used to form the organic polymer are hydrophilic and form a shell that is hydrophilic, swellable, and partially hydrolysable, which allow for the hollow porous structure to be formed. By using hydrolysable monomers to form the shell, pores can be formed in the resulting hollow porous structure, as discussed herein, when the organic polymeric particle is hydrolyzed. Examples of organic monomers useful for the organic polymer of the shell, and resulting hollow porous structure, include styrene, α-methyl styrene, methyl methacrylate, acrylonitrile, vinyl toluene, ethylene, vinyl chloride, and vinylidene chloride, among others. For example, the organic polymer of the shell and resulting hollow porous structure can be selected from the group consisting of styrene, methyl methacrylate, and acrylonitrile.

In addition, the organic polymer the hollow porous structure can be formed from 1 to 25 weight parts of a second monomer containing an acid group, a latent acid group, or a combination thereof. In embodiments where the second monomer includes a latent acid group, the latent acid group can form a carboxylic acid upon hydrolysis. In some embodiments, the organic polymer of the hollow porous structure can be formed from 1 to 25 weight parts of a second monomer having an acid group.

Suitable acid groups included in the second monomer include, but are not limited to, acrylic acid, methacrylic acid, (meth)acryloxypropionic acid, itaconic acid, aconitic acid, maleic acid or anhydride, fumaric acid, crotonic acid, monomethyl maleate, monomethyl fumarate, monomethyl itaconate, and/or an emulsion polymerizable αβ unsaturated carboxylic acid, among others. Latent acid groups can include vinyl acetate, acrylonitrile, (meth)acrylamide, ($C_1$-$C_{20}$) alkyl or ($C_3$-$C_{20}$) alkenyl esters of (meth)acrylic acid, such as methyl (meth)acrylate, ethyl (meth)acrylate, butyl (meth)acrylate, 2-ethylhexyl (meth)acrylate, hydroxyethyl (meth)acrylate, hydroxypropyl(meth)acrylate, benzyl (meth)acrylate, lauryl (meth)acrylate, olcyl (meth)acrylate, palmityl (meth)acrylate, Steryl (meth)acrylate and the like.

In some embodiments the Tg of the organic polymer of the hollow porous structure can be different (e.g., greater) than the Tg of the organic hydrophilic polymer of the organic polymeric particle. For the various embodiments, the Tg of the organic polymer of the hollow porous structure and of the organic hydrophilic polymer can be modified relative to each other to obtain a desired porosity of the organic polymeric particle. In addition, monomers used in forming the hollow porous structure can also be selected so as to form pockets of low Tg polymer in the hollow porous structure, which upon hydrolysis further enhance the porosity of the organic polymeric particle.

In some embodiments, the organic polymer of the hollow porous structure can be formed from 2 to 30 weight parts of a hydrolysable monomer, such as an acrylate monomer, and 70 to 98 weight parts of a polymer selected from the group consisting of styrene, methyl methacrylate, and acrylonitrile. In some embodiments, forming the hollow porous structure includes using the acrylate monomer in a range of 5 to 10 weight parts and a styrene monomer in a range of 95 to 90 weight parts, based on the total composition of the organic polymers of the shell.

Once the shell is formed to encapsulate the core, the shell can be expanded from its initial size to an expanded size by expanding the core. For the various embodiments, the core can be expanded to form the hollow porous structure from the shell, where the hollow porous structure has an expanded size larger than its initial size.

For the various embodiments, expanding the core to from the hollow porous structure from the shell can, for example, be accomplished by contacting the core and shell structure with a one molar equivalent of an alkaline based on the total acid and/or latent acid present in the core and shell structure.

For the various embodiments, suitable alkaline include, but are not limited to, ammonia, sodium hydroxide, and/or an amine. The mixture can then be heated under pressure (e.g., in a vessel rated to 75 psi) to 140° C. for 120 minutes and cooled. For the various embodiments, the expanded size of the hollow porous structure is larger than the initial size of the shell.

The hollow porous structure and the organic hydrophilic polymer are then hydrolyzed in order to form pores in the hollow porous structure and the organic hydrophilic polymer. In some embodiments, the size of the pores on the hollow porous structure can be adjusted by adjusting the amount of acid group and/or latent acid group used in forming the organic polymer of the hollow porous structure. Similarly, the void volume fraction of the particle can be adjusted by adjusting the amount of the organic hydrophilic polymer used to form the organic hydrophilic polymer. For example, the void volume fraction of the organic polymeric particles can range from 40 percent to 85 percent, from 50 percent to 80 percent, and from 60 to 80 percent.

By forming a organic polymeric particle with a large void volume fraction and the hollow porous structure having a pore surface area greater than 1 percent of a total theoretical exterior surface area, the organic polymeric particle is highly absorbent and calenderable. For example, since the organic hydrophilic polymer and the hollow porous structure are hydrophilic, they can act to attract fluids, for example, those fluids included in inks used in inkjet printers. Also, by having a large void volume fraction the organic polymeric particle can absorb fluids, as compared to a solid polymeric particle. In addition, the void volume fraction can provide an organic polymeric particle that is flexible, rendering it calenderable to provide a coating with high gloss and smoothness, as discussed further herein.

Suitable organic polymeric particles are available in a range of sizes and void volume fractions. For example, the particle size of the organic polymeric particle can range from 0.35 to 5.0 microns, preferably 0.5 to 2.0 microns, and most preferably from 0.8 to 1.2 microns.

The organic polymeric particle, as discussed herein, can be included in paper coating compositions of the present disclosure. For example, the paper coating composition can include the organic polymeric particles of the present disclosure in a range of 20 to 70 weight parts per 100 weight parts total particle, with the remainder of the 100 parts of particle being other particles. In addition, mixtures of the organic polymeric particles can be employed in the paper coating compositions. Such compositions can be considered polymodal systems, where "polymodal" refers to a paper coating composition including organic polymeric particles with at least two different dimensional qualities, e.g., particle sizes. The paper coating compositions can be bimodal, with two different sized organic polymeric particles. Paper coating compositions with more than two different sized organic polymeric particles, however, are also possible.

The paper coating compositions of the present disclosure include a binder. For the various embodiments, the binder for the paper coating composition can be selected from the group consisting of a synthetic latex, a starch or other natural binder such as a protein (e.g., soy, casein, albumin), polyvinyl alcohol, carboxymethyl cellulose, hydroxymethyl cellulose, polyvinyl alcohols, polyvinyl pyrrolidone, polyacrylate salt, and mixtures thereof. In one embodiment, the binder employed in the paper coating composition is a synthetic latex. Specifically, the synthetic latex can be selected from the group of a polymerized form of styrene, butadiene, acrylonitrile, butyl acrylate, methyl methacrylate, styrene-butadiene, styrene-butadiene-acrylonitrile, styrene-acrylic, styrene-butadiene-acrylic, vinyl acetate, and mixtures thereof. Additional examples of monomers that can be used in the preparation of synthetic latex include mixtures of ethylene and vinyl acetate, and esters of acrylic acid and/or methacrylic acid.

In addition, the binders of the present disclosure can be carboxylated. For example, the synthetic latex binders provided herein can be carboxylated, i.e. copolymerized with a carboxylic acid.

For the various embodiments, the binder of the paper coating composition can be an aqueous dispersion of a polymer. As appreciated, the aqueous portion of the binder is, for the most part, evaporated during the manufacture of the coated paper, as discussed herein. In one embodiment, the synthetic latex binder is an example of such an aqueous dispersion of a polymer. In addition, the synthetic latex can have a monomodal or polymodal, e.g. bimodal, particle size distribution. Mixtures of binders can also be used in the paper coating composition.

The average size of the binder in the paper coating composition can range from 450 to 5,000 angstroms. Paper coating compositions with binders having relatively smaller size typically exhibit improved coating strength because smaller particles provide a greater surface area per unit weight with which to bind the other coating components.

A wide variety of commercially available binders are available. Examples of suitable latex binders include: CP 615NA, CP 638NA, DL 920, DL 966, PROSTAR 5401, and CP 692NA, manufactured by The Dow Chemical Company; GenFlo® 557 and GenFlo® 576, manufactured by Omnova Solutions Inc.; and Acronal® S 504 and Acronal® S 728, manufactured by BASF Corporation. A suitable starch binder can include Penford™ Gum PG290 (Penford Products Co., Cedar Rapids Iowa).

For the purposes of this disclosure, the binder can be selected and the amount used can be sufficient to ensure that the binder has sufficient adhesive properties and coating strength for use in the manufacture of coated paper. For the various embodiments, the amount of binder in the paper coating composition should provide adequate coating strength to resist picking. Surprisingly, the percentage of binder needed for the paper coating composition can be less than 10 percent by weight of the paper coating composition. For example, a suitable percentage for the binder can include, but is not limited to, a range between 6 percent and 10 percent by weight of the paper coating composition. In one embodiment, the percentage of binder that can be used in the paper coating composition can be 5 percent to 7 percent by weight of the paper coating composition.

As discussed herein, the paper coating composition can include additional pigments and/or particles beyond the organic polymeric particle(s) discussed herein to attain the 100 weight parts total particle. In some embodiments, the additional particle can be an inorganic particle. Examples of the inorganic particle can include kaolin clay, talc, calcined clay, structured clay, ground calcium carbonate, precipitated calcium carbonate, titanium dioxide, aluminum trihydrate, satin white, silica, zinc oxide, barium sulfate, and mixtures thereof. Calcium carbonate is a particularly preferred inorganic particle.

In some embodiments, the additional particle added to the paper coating composition to attain 100 weight parts total particle can be an inorganic particle and/or a solid polymeric particle. As used herein, solid polymeric particles include those polymeric particles that have no more than a 5 percent void volume fraction. Examples of suitable solid polymeric particles include, but are not limited to, Plastic Pigment 722 (PP 722), Plastic Pigment 730, or Plastic Pigment 756 available from The Dow Chemical Company.

Additionally, in various embodiments, the additional particles added to the paper coating composition to attain 100 weight parts total particle can be substantially free of solid polymeric particles.

If desired, conventional additives can also be incorporated into the embodiments of the paper coating compositions in order to modify the properties thereof. Examples of these additives include conventional thickeners, dispersants, dyes and/or colorants, preservatives, biocides, anti-foaming agents, optical brighteners, wet strength agents, lubricants, water retention agents, crosslinking agents, surfactants, and control agents, and mixtures thereof. The use of other additives in the paper coating composition is also possible. Practitioners skilled in the art are aware of how to select the appropriate additional additives to achieve the desired final product attributes.

For the embodiments of the present disclosure, the paper coating composition is applied over at least one of a first and/or a second major surface, opposite the first major surface, of a base paper before a calendering process.

The paper coating composition can be applied to the base paper using a number of different coating techniques. Examples of these techniques include rod, grooved rod, curtain coating, stiff blade, applicator roll, fountain, jet, short dwell, slotted die, bent blade, bevel blade, air knife, bar, gravure, size press (conventional or metering), spray application techniques, wet stack, and/or application during the calendering process. Other coating techniques are also possible.

In one embodiment, one or more layers of the paper coating composition are applied on at least one side of the base paper using a rod and/or a stiff blade coating technique. In one embodiment, the coat weight applied per side can be 0.5 to 20 g/m$^2$. In an additional embodiment, the coat weight can be at least 2 g/m$^2$. In another embodiment, the coat weight can be 2 to 10 g/m$^2$. In one embodiment, the paper coating composition can be applied to both sides of the base paper to ensure that the printed images on both sides of the printing sheet are of comparable quality. In one embodiment, the paper coating composition can be applied as a single layer to the base paper.

The layer(s) of the paper coating composition can then be dried. Drying of the paper coating composition can be accomplished by convection, conduction, radiation, and/or combinations thereof.

In addition, the coated paper can also include a base coat between the base paper and the coating of the present disclosure. As used herein, a "base coat" refers to a pigmented or unpigmented coat that is under the paper coating composition of the present disclosure and can include a binder. When the base coat is pigmented, the pigment can be selected from the group consisting of kaolin, talc, calcined clay, structured clay, ground calcium carbonate, precipitated calcium carbonate, titanium dioxide, aluminum trihydrate, satin white, hollow polymeric particle, solid polymeric particle, silica, zinc oxide, barium sulfate, and mixtures thereof. The pigment component of the base coat can have a monodisperse or polydisperse particle size distribution.

The base coat layer can be applied to the base paper prior to the application of the paper coating composition. The base coat layer can be applied in a similar manner as the paper coating composition as described herein, and may be applied in one or more layers.

The base paper with its coating of the paper coating composition can then be calendered. As used herein, "calendered" refers to a wide range of different operations in which multiple rolls are used to process the coated paper through one or more nips. Examples of such on or off machine calendering processes can include, but are not limited to, single-nip calendering, hot/soft calendering, multi-nip calendering, extended nip calendering, and super calendering processes. The rolls of the calender can be made of a variety of materials. For example, the rolls can be formed of metal (e.g., steel), have a polymeric covering, and/or a cotton covering, where the different rolls can each having different diameters and optional coverings. In embodiments of the present disclosure, the paper coating composition and base paper can be calendered at a minimum pressure of 200 pounds of force per linear inch.

As appreciated, the effect of calendering processes on the coated paper properties depends on the temperature of the roll surfaces, the running speed, the elastic properties of the rolls and the linear load between the rolls, among others. In one embodiment, the linear load range of the calendering process can range from 35 to 525 kN/m, and the operating roll temperature can range from 20° C. to 300° C. In an additional embodiment, the operating roll temperature can be from 90° C. to 150° C. (i.e., where no heat is added to the rolls of the calendering process).

For the various embodiments, calendering the layer of the paper coating composition on the base paper can provide a smoothness of the coating of less than 2 PPS-H5 (Parker PrintSurf 5). In addition, the coated paper can further display a TAPPI gloss value in a range of 20 to 90 as determined at a 75° angle of reflectance. For the various embodiments, coated paper having this smoothness and high gloss can be produced with the thermal rolls of the calender operating with substantially no heat added to the calendering process.

For the various embodiments, the combination of high gloss, fast absorption, and good smoothness for the coated paper is achieved due to the high void volume fraction and the dimensional stability of the organic polymeric particles included in the paper coating composition of the present disclosure.

For example, the paper coating compositions of the present disclosure can be used to form a coating on paper for use with inkjet printers. As discussed herein, the void volume fraction of the organic polymeric particles provides the coatings formed from the paper coating composition with faster absorption rates as compared to coatings formed from paper coating compositions that include other organic particles. For the various embodiments, the coating of the present disclosure provides for an ink set off brightness value that is at least 10 percent larger at 30 seconds after printing than coatings having organic particles chosen from a group consisting of solid particles, hollow particles, and combinations thereof.

In addition, the organic polymeric particles in the paper coating compositions of the present disclosure can be compressible during calendering, giving good smoothness and gloss due to the porosity of the organic polymeric particles. In contrast, coatings formed from paper coating compositions having inorganic particles, such as alumina and silica, maintain surface roughness and therefore provide a coating with low gloss due to the incompressible nature of the inorganic particles.

Embodiments of the present disclosure also include a coated paper that has a base paper, a coating over at least one of a first and second major surface of the base paper, where the coating is formed from a paper coating composition having a binder, and a organic polymeric particle according to the present disclosure. As will be appreciated, the coated paper can be used in a number of applications, including, but not limited to, printing with an inkjet printer and, accordingly, inkjet ink, among other applications. In one embodiment, the coated paper includes a cationic fixative layer. Fixatives can be incorporated into a coated paper to reduce bleeding tendency and to "lock" color elements of the ink near to the coated surface to improve mottle and ink density. Fixatives can be cationic materials that can be incorporated into the paper coating composition or added as a separate layer on top of a previously coated paper. In some instances, a cationic fixative layer can act as a scavenger of interfering anionic contaminants, so as to protect the cationic sites of a subsequent component. In other applications, the cationic fixative layer can be added to reverse the charge on the surface of the paper, thus, enabling retention by subsequent addition of an anionic polymer.

In embodiments of the present disclosure, the cationic fixative layer can be selected from calcium chloride and poly-diallyldimethyl ammonium chloride (poly-DADMAC). Other cationic fixatives can include polyethylene amide, or other small polymers, such as modified polyamides, polyethylene imines, aluminum sulphonate, or poly-aluminum chloride, among others. In one embodiment, the cationic fixative can be included in the coating composition of the present disclosure. In some embodiments, the cationic fixative can be included in a second paper coating composition applied after the paper coating composition of the present disclosure.

In addition to their use in coatings and paper coating compositions, as discussed herein, the organic polymeric particle of the present disclosure can have applicability in other applications that may benefit from their fluid absorbent ability. Such applications can include, but are not limited to, super absorbents, moldable absorbents, rolled goods, packaging, waste solidification, absorbent films, fabric coatings and non-woven's and diapers, among other applications.

EXAMPLES

The following examples are given to illustrate, but not limit, the scope of this disclosure. Unless otherwise indicated, all parts and percentages are by weight. Unless otherwise specified, all instruments and chemicals used are commercially available.

Test Methods

Volume Median Diameter

The volume median diameter of the organic polymeric particles is measured by hydrodynamic chromatography. The method of determining the volume median diameter using hydrodynamic chromatography is presented in "Development and application of an integrated, high-speed, computerized hydrodynamic chromatograph", *Journal of Colloid and Interface Science*, Vol. 89, Issue I, September 1982, Pgs. 94-106, Gerald R. McGowan and Martin A. Langhorst, which is incorporated herein by reference in its entirety.

Gloss

Paper gloss is measured using a Technidyne Glossmeter model T 480A at an incident angle of 75° (degrees). Gloss is measured by measuring multiple sites on a coated paper sample to generate a composite reading of 2 measurements at each of 5 positions in a straight line across each coated paper sample (i.e. far left, left of center, center, right of center, far right). Gloss number reported is an average of the 10 readings.

Coat Weight Measurement

Coat weights are determined by subtracting the mass of a coated paper sample from an uncoated paper sample after the coated paper sample has been dried in a hot air oven for 10 minutes at 130-140° C. Specimen samples are cut from 12 sheets with a 100 cm² cutting die for the base paper and for each coating run. Coat weight number reported is an average of 12 samples.

Smoothness

Smoothness testing is done using the print surface apparatus as described in TAPPI test method T-555. Testing is done both with the 0.5 and 1.0 kg loading on 10 or more sheets per sample of the coated paper after conditioning the coated paper in an atmosphere of 50%±2.0% relative humidity (RH) and 23° C.±1.0° C. for 24 hours, and testing the paper in the same atmosphere. Smoothness number reported is an average of 10 measurements.

Void Volume Fraction

The void volume fraction is determined using the following procedure. To a 50 milliliter polypropylene centrifuge tube (with hemispherical bottom) is added 40 grams of latex containing the organic polymeric particles. The tube is placed in a centrifuge and is spun at 19,500 rpm for 180 minutes. The supernatant is decanted and weighed. From the latex mass, percent solids, and supernatant mass the void volume fraction ($f_{vow}$) is determined using the following equations:

$$f_{void}=((V_T-S_{H2O})*(F_R-V_P))/((V_T-S_{H2O})*F_R)$$

where:

$V_P$=Polymer volume (polymer mass/polymer density) where the density of copolymers is calculated using literature values for the density of the homopolymer of each monomer, and assuming that the density of the copolymer is a linear function of the composition of the copolymer. See Peter A. Lovell and Mohamed S. El-Aasser, "Emulsion Polymerization and Emulsion Polymers"; p. 624, John Wiley and Sons: New York (1997), which is incorporated herein by reference in its entirety.

$V_T$=total volume in the tube (mass latex/density of latex)
$S_{H2O}$=volume of supernatant=weight of supernatant
$F_R$=packing factor equals 0.64 for random packing of essentially monodisperse spheres. The packing factor is a correction corresponding to the volume fraction of solids in the hard pack.

Pore Surface Area

Pore surface area is determined using SEM images of the organic polymeric particles. To determine pore surface area, some inferences from the data are used. First, the only pore areas reliably illustrated and measurable are located on the top surface of the hollow porous structure of the organic polymeric particle, which is likely only the middle third of the projected diameter that is seen in the images. This is due to the fact that the pores that are further toward the side of the organic polymeric particle are at an angle, so that the projected cross-section of the pore is less than the true cross-section of the pore. Second, the SEM shows a straight-down projection of the sphere, so the "area" of the hollow porous structure of the organic polymeric particle that is measured is off by a factor of two. The weighted average of the largest 10 percent of the pores is used as the pore size.

To estimate the pore area as a fraction of a sphere surface, it is estimated that the SEM images provide an image of only a portion of the organic polymeric particle, termed a "cap." The cap is created by cutting the sphere with a plane:

$$S=2\pi rh$$

where S is the surface area of the cap;
r is the radius of the spherical organic polymeric particle; and
h is the height of the cap above the intersecting plane.

If c is defined as the fractional radius of the base of the cap compared to the radius of the sphere, then:

$$S=2\pi r^2(1-\sqrt{(1-c^2)})$$

Formulations

The following materials are used in the coating formulations:

Methyl Acrylate available from ALDRICH®.
Methyl Methacrylate available from ALDRICH®.
Styrene available from ALDRICH®.
Acrylic Acid available from ALDRICH®.
1,3 Butadiene available from Texas Petrochemicals, Inc.
Butyl Acrylate available from ALDRICH®.
NaOH solution (10 weight percent) available from ALDRICH®.
Fumaric Acid available from ALDRICH®.
Carboxylated styrene butadiene (SB) latex binder "CP 615NA," available from The Dow Chemical Company, Midland Mich., USA.
HS 3020 is a semi-porous particle available from The Dow Chemical Company, Midland Mich., USA.

Processes for making the organic polymeric particles 1-5 provided in Table 1, below, are as follows.

Prepare a core latex by a persulfate initiated, seeded, semi-batch emulsion polymerization. Add 1410.6 g (58 parts) methyl methacrylate (MM) and 1021.5 g (42 parts) methyl acrylate (MA) over 3 hours to a two-gallon reactor charged with water (2456 g), seed latex (1.41 g), and VERSENOL 120 (a chelating agent available from The Dow Chemical Company) (0.45 g) maintained at 100° C. During the monomer addition, water (503 g), sodium alkylbenzene sulfonate (10.2 g), sodium persulfate (6.8 g), and sodium bicarbonate (0.4 g) are also added. After completion of the reaction, the reactor contents are cooled and the resulting core latex is removed from the reactor. The core latex has 42 percent solids and a pH of 2.7. The core latex is hydrolyzable and expandable to form the expanded core.

Preparation of the organic polymeric particle of the present disclosure continues by forming a shell over the core latex, for which the reaction is as follows. Add styrene (733.6 g) and acrylic acid (8.5 g) over the course of 100 minutes to a reactor charged with water (1713 g), the core latex prepared as described above (192.2 g), and sodium persulfate (3.27 g). The reaction proceeds at a pH of 2.1 and at a temperature of 92° C. During monomer addition, add water (112.3 g) and sodium alkylbenzene sulfonate (0.71 g). Variants of the shell composition are also made with BA or MA replacing some of the styrene as indicated in Table 1, below.

After completion of the reaction, add sufficient NaOH to increase the organic polymeric particle pH to about 12. Maintain the organic polymeric particle encapsulated core latex at 140° C. for several hours to hydrolyze the MA in the core to acrylic acid (AA), and osmotically expand the encapsulate core latex to form the expanded core and hollow porous structure. Post-add fumaric acid to reduce the pH of the organic polymeric particle to about 8. The resulting organic polymeric particle has a volume median diameter of about 1.0 micron and a void volume fraction in a range of 56 to 70 percent, as shown in Table 1.

From the examples provided in Table 1, the amount of acrylate (BA or MA) used in the shell layer reaction influences the degrees of porosity, void volume fraction and pore size in the resulting organic polymeric particle. The acrylate in the shell layer will hydrolyze during the expansion step, increasing the porosity of the hollow porous structure. The size of the pores can be adjusted by varying the acrylate (BA and/or MA) level, while the void volume fraction of the organic polymeric particle can be controlled by adjusting the amount of core used. For example, void volume fractions from 40% to 85% can be achieved by either decreasing or increasing, respectively, the parts core latex used in the shell forming reaction discussed above.

Descriptions of the experimental latexes are included in Table 1.

TABLE 1

| Hollow Particle | Parts Core | Parts Acrylate in Shell | Particle Size (microns) | Void Volume Fraction | Shell Porosity | Pore Size |
|---|---|---|---|---|---|---|
| HS 3020 | 12.3 | 0 | 1.0 | 51 | Very Low | Very Small |
| Organic Polymeric Particle 1 | 9.3 | 5 BA | 1.0 | 56 | Medium | Medium |
| Organic Polymeric Particle 2 | 13.0 | 5 BA | 1.1 | 69 | High | Large |
| Organic Polymeric Particle 3 | 9.3 | 10 BA | 1.0 | 60 | Medium | Large |
| Organic Polymeric Particle 4 | 9.5 | 10 MA | 1.1 | 63 | Medium | Medium |
| Organic Polymeric Particle 5 | 13.0 | 10 MA | 1.1 | 70 | High | Medium |

FIGS. 1A-1F shows the scanning electron micrographs for the hollow particles of Table 1. As can be seen from the SEM images of FIGS. 1A-1F, the organic polymeric particles formed from BA and MA in the shell polymers form a porous organic polymeric particle. As shown in FIGS. 1A-1F, HS 3020 (FIG. 1A) has a few small pores, relative to the pores seen in organic polymeric particles 1-5 (FIGS. 1B-1F)

Coated Paper

The base paper for the coated paper is a 58 lb/3300 ft$^2$ wood-free, Kraft fiber sheet which has been pre-coated with a pigmented size (Utopia, Available from Appleton Papers). Coating formulations are as follows: 55 parts by weight of ground calcium carbonate (Hydrocarb 60, Available from Omya) and 45 parts of the particle, listed in Table 2, to give a total particle basis of 100 parts by weight. All coating formulations contained 10 parts of carboxylated SB latex binder CP 615NA, along with 1 part of a synthetic thickener (Alcogum L-229, Available from AKZO NOBEL). The coating formulations and physical properties are given in Table 2.

TABLE 2

| Coating Formulation | Hydrocarb 60 (parts by weight) | Particle (parts by weight) | CP 615NA (parts by weight) | Alcogum L-229 (parts by weight) | % Solids | pH |
|---|---|---|---|---|---|---|
| HS 3020 | 55 | 45 | 10 | 1 | 40 | 8.5 |
| Organic Polymeric Particle 2 | 55 | 45 | 10 | 1 | 26 | 8.5 |
| Organic Polymeric | 55 | 45 | 10 | 1 | 28 | 8.5 |

TABLE 2-continued

| Coating Formulation | Hydrocarb 60 (parts by weight) | Particle (parts by weight) | CP 615NA (parts by weight) | Alcogum L-229 (parts by weight) | % Solids | pH |
|---|---|---|---|---|---|---|
| Particle 4 | | | | | | |

Coating Procedure

Apply the coating formulation to the base paper using a Dow Laboratory Coater. Coat the base paper in web form utilizing a blade-metering method at a coating speed of 15 feet/minute. Apply the coatings via syringe to the gap formed between the metering blade and the paper web. Achieve the target coating weight (grams/m$^2$) through a combination of web speed and backing tube pressure on the metering blade. Once applied, dry the coating with two infrared drying zones and two hot-air flotation drying zones operating at 250° C. The final moisture of the coated paper can be varied through a combination of speed and drying temperatures.

Calendering Procedure

Cut the coated paper into sheet size (8.5×11 inches) prior to the laboratory calendaring process. Calendering is performed with a Beloit Wheeler Model 753 Laboratory calender. All conditions were run with a steel roll temperature of 150° F., 3 nips, and varying pressure loadings of 200, 400, and 600 pounds per lineal inch (pli).

Example 1

Wick and Bleed on the Coated Papers

The wick and bleed test provides a good quantitative measure of water absorption for a coated paper. Example 1 evaluates the wick and bleed properties of dye based ink in printed lines made on samples of the coated paper. The dye based in is HP 78 Tri-Color Inkjet print cartridge and HP 45 black inkjet print cartridge. An HP Deskjet 932C was used to create the printed lines on the coated paper.

The present example further evaluates the use of two alternative cationic fixative layers on the coated papers having coating formulations provided in Table 2, above, to reduce the wicking and bleeding of inkjet inks. Each of the coated papers has a coat weight of 6.5 to 8.5 g/m$^2$ of the coating formulation provided in Table 2. The cationic fixatives consisted of a 5% by weight solution of CaCl$_2$ (Available from Aldrich) and a 0.5% by weight solution of a low molecular weight poly-diallyldimethyl ammonium chloride (p-DADMAC) (Available from Aldrich and supplied as a 20% w/w, Mw 100000-200,000 g/mol).

The two cationic fixative solutions are applied to the coated papers using an automated, bench top, draw down coater (TMI K-Control Coater; Model K303). Excess fixative solution, at their respective concentrations, is applied to the surface of the coated paper and then metered using a #2 Mayer rod (Rods made by RD Specialties, Webster, N.Y.). After the fixative layer has been applied the coated paper is placed into a forced hot air oven at 150° C. for one minute.

Use the HP Deskjet 932C to print an ImageXpert™ Printer 720 dpi Target Version 5.1 from ImageXpert Inc. (referred to herein as "Print Form") on the coated paper. The Print Form provides both a black line and a magenta line printed over a yellow block on the coated paper, from which both the wick and bleed properties of the coated paper can be assessed. The black line width is an indication of the amount of wicking. Bleed is defined as the line thickness of the rightmost magenta line printed over a yellow block on the above mentioned Print Form. Experience to date has indicated that bleed is the most important print quality concern as far as particle choice for a coating composition is concerned.

Once the Print Form is printed on the coated paper, use a LEICA® light microscope with the "zoom drive magnification in the Leica® acquire window" (based on the appropriate lens magnification) to measure the line thickness of the printed black line and the magenta line of the Print Form. Two measurements were taken on each line at the widest spot of the line. As each coated paper with its Print Form was formed and handled under similar conditions and in a similar manner, the provided test results are relative to each other.

Figure 2:
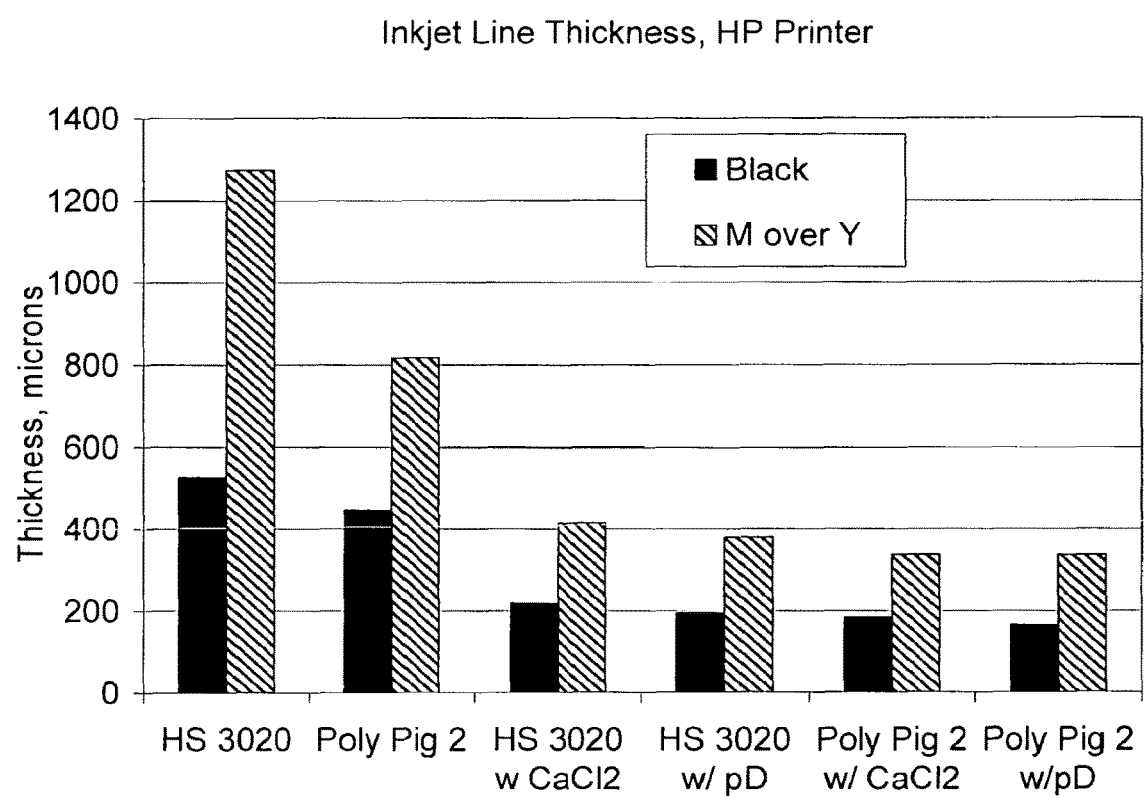
FIG. 2 is a graph illustrating inkjet line thickness on coated papers according to the present disclosure.

FIG. 2 illustrates the difference for wick and bleed test results between coated papers with and without the cationic fixative using the HP Printer, where the coated papers have either the coating formulation with HS 3020 (Table 2) or the coating formulation with organic polymeric particle 2 (Table 2). The first two coated papers from the left in FIG. 2 do not have fixatives and can be compared with the corresponding coated papers on the right of FIG. 2 with either p-DADMAC (pD) or $CaCl_2$ as the cationic fixative. As shown in FIG. 2, the coated papers including the cationic fixative layer show a reduced thickness for the black line (wick) and a reduced thickness for a magenta line printed over a yellow block (bleed) as compared to the coated papers without the cationic fixative layer.

While the coated paper prepared with the coating formulation having HS 3020 shows good single line thickness, it shows very poor bleed tendency when covered with high levels of ink (magenta over yellow). As compared to the coating formulation having HS 3020, the coating formulation having the organic polymeric particle of the present disclosure (e.g., organic polymeric particle 2) significantly improves the wick and bleed performance of the coated paper. The organic polymeric particles of the present disclosure also provide for improved performance when fixative layers are applied.

Example 2

In this example, a coated paper with the coating formulation having organic polymeric particle 4, as described in Example 3, is compared to a range of photo-quality paper purchased at Staples® and printed on the HP printer. The photo quality paper tested included Epson® ColorLife Semi-Gloss, Staples® Photo Supreme Matte finish, Epson® Matte Heavyweight photo paper, and HP Premium Plus paper. Prepare the coated paper having the coating formulation with the organic polymeric particle 4, as described in Example 3, according to the procedure described above in Example 1. The fixative solution were also applied as describe in Example 1 at 0.5 wt. %.

Figure 3:
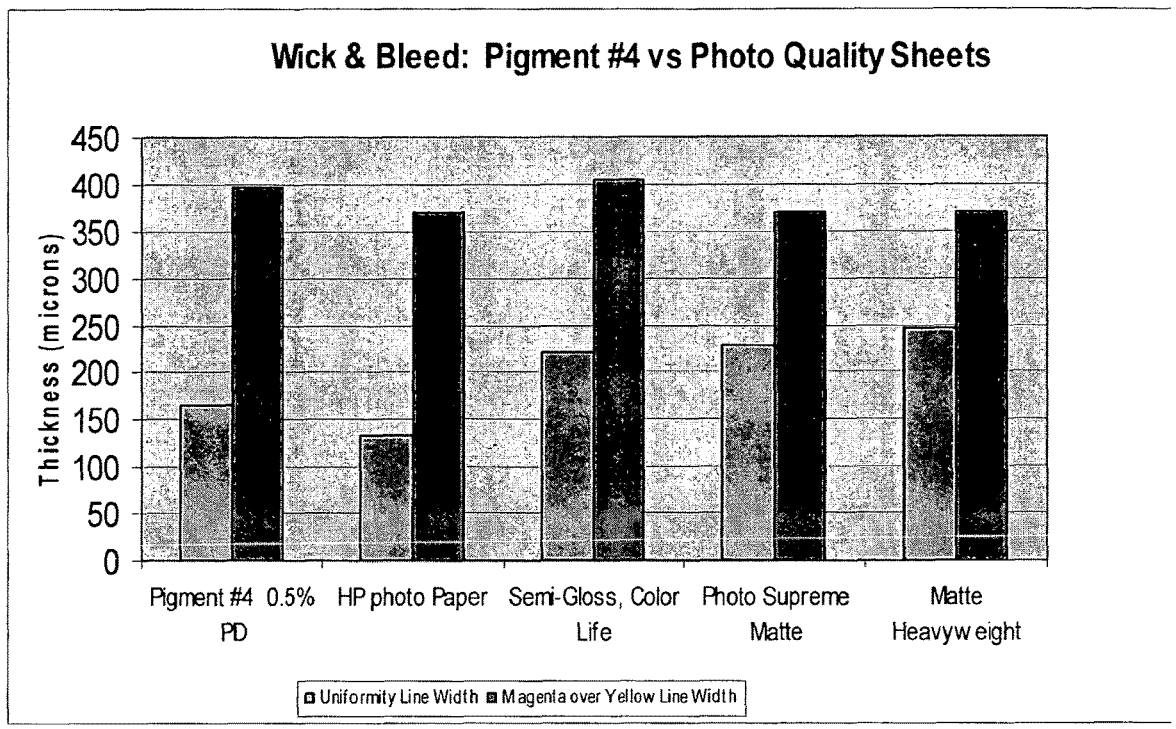
FIG. 3 is a graph illustrating wick and bleed test results for coated papers having coating formulations of the present disclosure and commercially available inkjet papers.

Wick and bleed results for the present examples are shown in FIG. 3. As shown in FIG. 3, the coating formulation having the highly porous particle of the present disclosure (e.g., organic polymeric particle 4) compare surprisingly well (display comparable wick and bleed properties) with commercially available ink jet papers, including "photo quality" ink jet papers.

Example 3

Materials

Hewlett Packard Deskjet 932C Printer with an HP 78 Tri-Color Inkjet print cartridge and an HP 45 black inkjet print cartridge.

Samples of the coated paper cut to 8.5 by 11 inches (11 inch is in the machine direction).

Staples® 92 brightness 20 pound plain copy paper (for use as a place to "blot" undried ink).

Heavy weight roller (5 pounds, 1.75 inch face width, 3.5 inch diameter).

Figure 4:
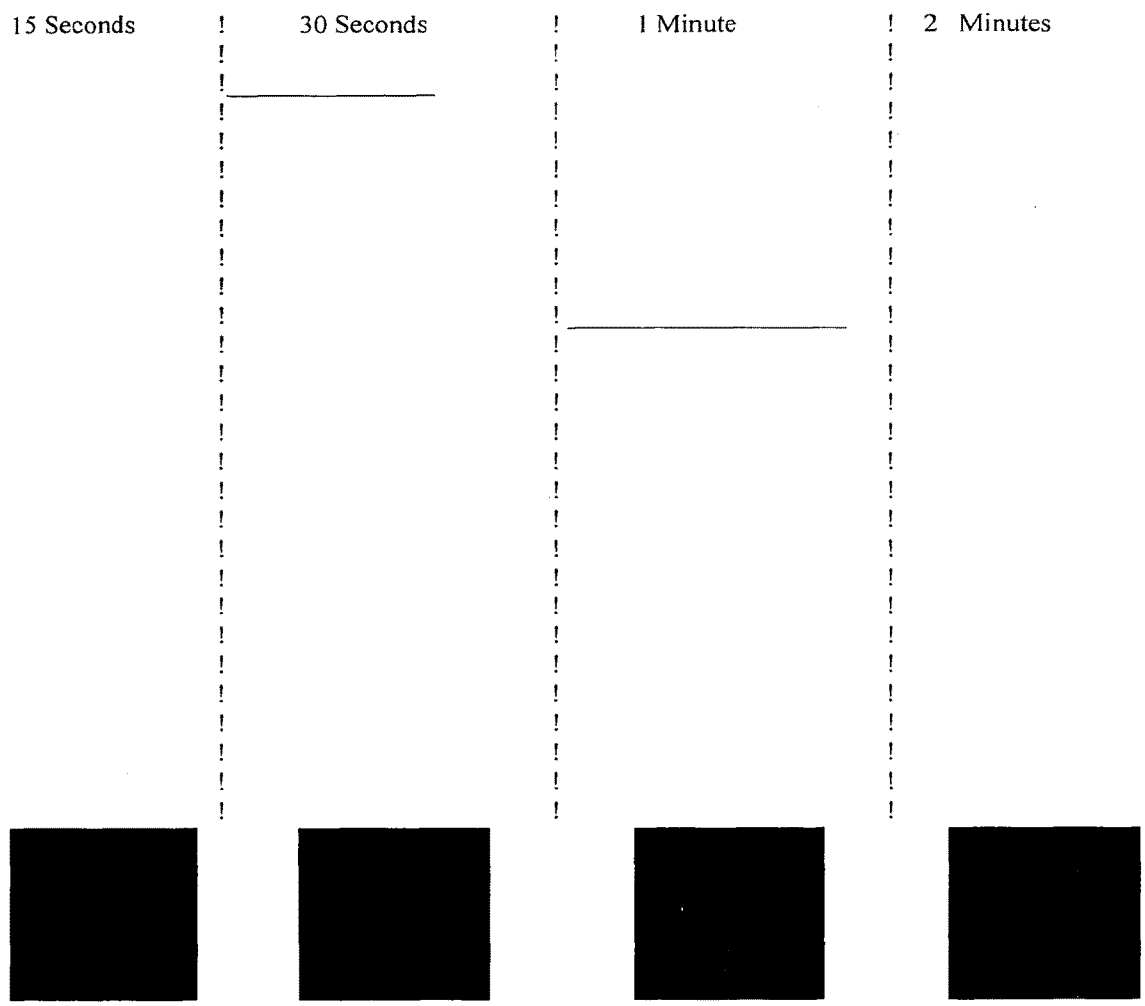
FIG. 4 is a Dow Print Form used in making inkjet ink set time measurements.

Computer connected to printer and loaded with a Dow Print Form, provided as FIG. 4.

Calcium Carbonate pigments HYDROCARB 60 available from Omya, Inc, Proctor Vt., USA.

Coat the coating formulas provided in Table 3, below, onto the base paper (Utopia 58 lb/3300 $ft^2$ wood-free, Kraft fiber sheet which has been pre-coated with a pigmented size from Appleton Papers) at a coat weight of 6.5 to 7.5 grams/$m^2$ (gsm), according to the coating procedure discussed above. Calender the coated paper at 400 pounds of force per linear inch (pli) according to the Calendering Procedure discussed above.

Initiate a print procedure on the computer to create the Dow Print Form (FIG. 4) on the coated paper. The HP Printer settings were photo printing borderless, best quality, other photo papers. As each coated paper with its Dow Print Form was formed and handled under similar conditions and in a similar manner, the provided test results are relative to each other.

Start the timer as the Dow Print Form exits the printer. The black print blocks of the Dow Print Form are the last to exit the printer. Place one sheet of the copy paper over a first section of Dow Print Form and roll the roller over the black print block after 15 seconds. Move the copy paper so that an un-used portion of the copy paper is positioned over subsequent black print blocks at the time indicated on the Dow Print Form. Measure the brightness of the ink squares transferred to the copy paper using a TAPPI G.E. Brightness meter. Record the brightness readings from the copy papers.

The particles used in the coating formulas provided in Table 3, below, are all organic. These particles include: AF 1055, which is a hollow particle available from Rohm & Haas, Inc.; PP 722, which is a solid particle available from The Dow Chemical Company; HS 3020, which is a semi-porous particle available from The Dow Chemical Company; and organic polymeric particle 4 provided in Table 1, above, which is a hollow particle.

Table 3 gives the coating formulations of the coatings tested.

TABLE 3

| Coating Formulations | Hydrocarb 60 (parts by weight) | Organic Particle (parts by weight) | CP615 NA Binder (parts by weight) |
|---|---|---|---|
| HS 3020 | 55 | 45 | 10 |
| AF 1055 | 55 | 45 | 10 |
| PP 722 | 55 | 45 | 10 |
| Organic Polymeric Particle 4 | 55 | 45 | 10 |

Figure 5:
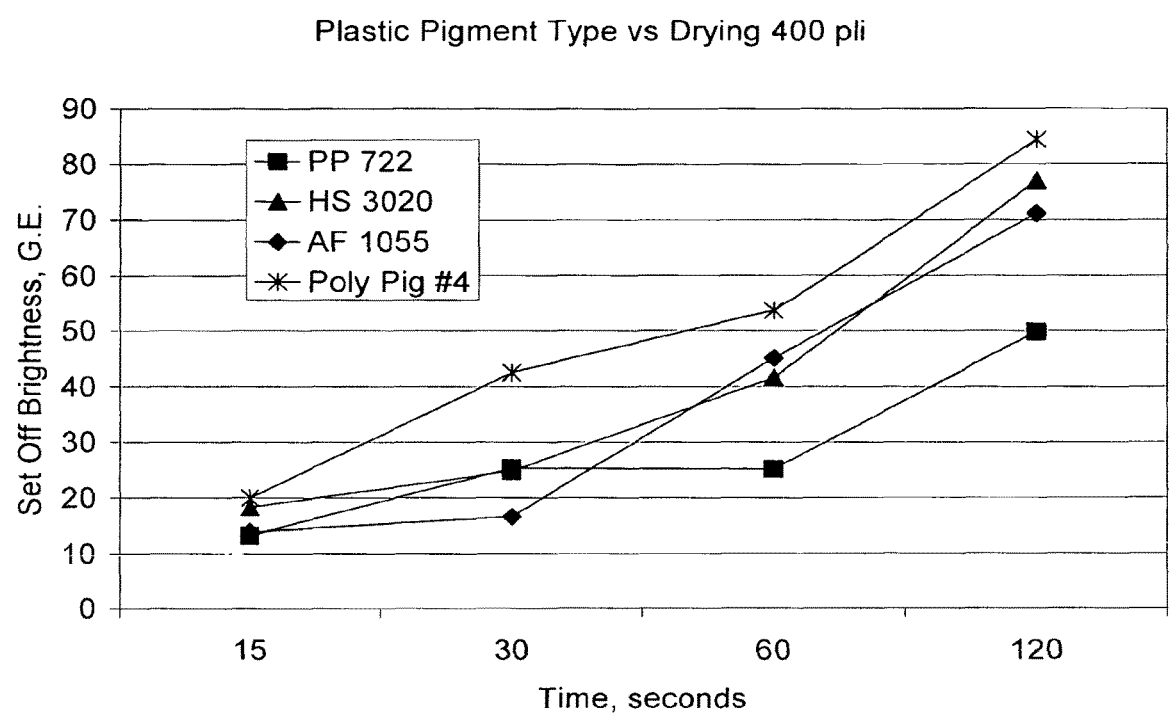
FIG. 5 is a graph illustrating an inkjet ink set time versus set off brightness for coated papers according to the present disclosure.

FIG. 5 illustrates a graph of inkjet ink set times versus ink set off brightness values. Higher ink set off brightness values, as measured with the TAPPI G.E. Brightness meter and as shown in FIG. 5 (and FIG. 6, below), indicate the transfer of less ink to the copy paper as well as a greater amount of ink drying that has taken place. As such, faster inkjet ink set times result in better ink set off brightness values.

As shown in FIG. 5, the coated paper having the coating formulation with organic polymeric particle 4, according to the present disclosure, has higher ink set off brightness values at each time interval as compared to the other coating formulations in Table 3. Low ink set off brightness values indicate that more ink is transferred onto the copy paper, indicating that the ink takes longer to dry. As such, at 120 seconds, the sheet coated with PP 722 transferred the most ink, and therefore had the lowest ink set off brightness value. In contrast, the coating formulation having organic polymeric particle 4 provides for an ink set off brightness value that is at least 10 percent larger at 30 seconds after printing than the coating formulations prepared with the other polymeric particles as provided in Table 3.

Figure 6:
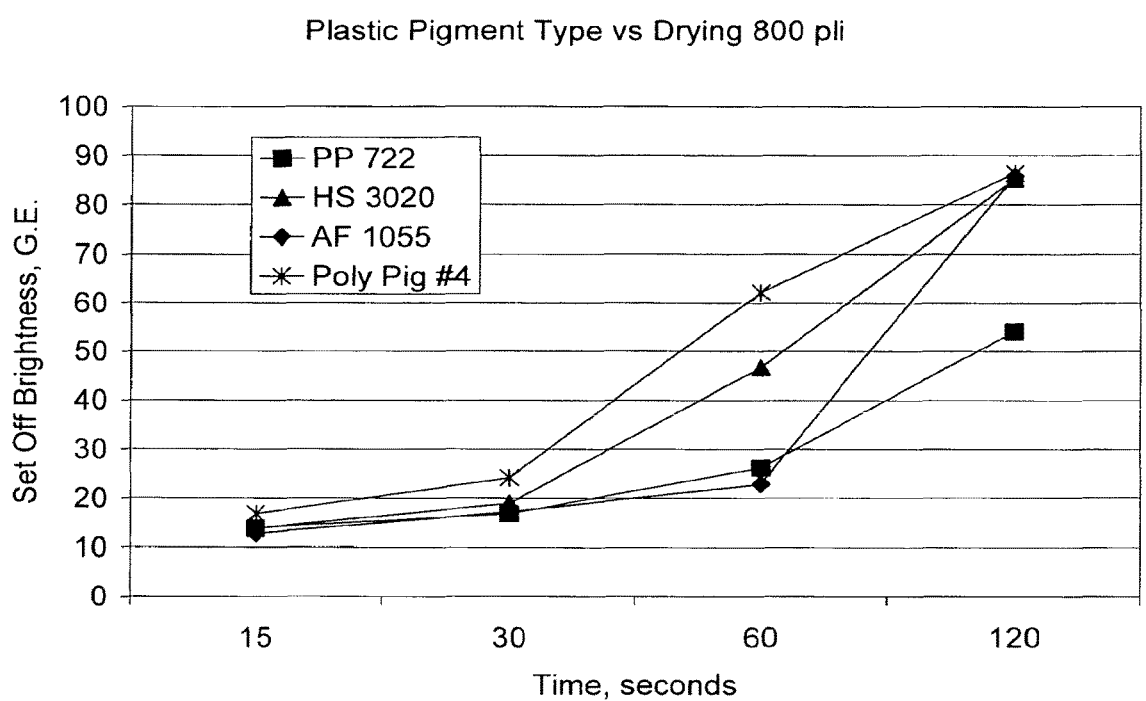
FIG. 6 is a graph illustrating an inkjet ink set time versus set off brightness for coated papers according to the present disclosure.

FIG. 6 illustrates a graph of inkjet ink set times versus ink set off brightness values for coated papers having the coating formulas provided in Table 3 prepared according to the coating procedure discussed above, but which have been calendered at 800 pli according to the Calendering Procedure discussed above. Once again, the printer settings are photo printing borderless, normal quality, other photo papers. As shown in FIG. 6, the coated paper with the coating formulation having organic polymeric particle 4 has the highest values for ink set off brightness at 30 and 60 seconds, indicating that the coating absorbed the inkjet ink faster than sheets with coated with the other coating formulations.

Example 4

In this Example, determine the pore surface area for organic polymeric particle 4 of the present disclosure and the HS 3020 particle according to the method described herein.

12 SEM images of organic polymeric particle 4 are taken at 50,000× magnification. Two hundred of the organic polymeric particle 4 are illustrated in the 12 images with a nominal area of about 1 square micrometer ($\mu m^2$) with a diameter of about 1.13 microns. In 200 of the organic polymeric particles, 1,876 pores are observed, with about 9.5 pores per particle. Since the area where the pores are visible constitutes about one-third of the entire surface of the organic polymeric particles, nominally, there are about 28 pores per particle. As used herein, a "Feret" diameter is the measured distance between parallel lines that are tangent to an object's profile and perpendicular to the ocular scale. Feret's diameter can be the greatest distance possible between any two points along the boundary of a region of interest. Table 4 provides the findings from the images of the organic polymeric particle 4.

TABLE 4

| Organic Polymeric Particle 4 | Area ($\mu m^2$) | Circularity | Feret ($\mu m$) | Eq. Diam ($\mu m$) |
|---|---|---|---|---|
| Mean | 0.00473 | 0.89560 | 0.08883 | 0.078 |
| Std. Dev | 0.00476 | 0.10032 | 0.04842 | |
| Min | 0.00003 | 0.55107 | 0.00824 | |
| Max | 0.04476 | 1 | 0.28621 | |

For the HS 3020 particle, 12 SEM images of the particles are taken at 100,000× magnification. Sixty-four of the HS 3020 particles are illustrated in the 12 images with a nominal area of about 1.08 $\mu m^2$ with a diameter of about 1.17 microns. In the 64 polymeric particles, 557 pores are observed, with about 8.7 pores per particle. Since the area where the pores are visible constitutes about one-third of the entire surface of the polymeric particles, nominally, there are about 27 pores per particle. Table 5 provides the findings from the images of the particle HS 3020.

TABLE 5

| HS 3020 | Area ($\mu m^2$) | Circularity | Feret ($\mu m$) | Eq. Diam ($\mu m$) |
|---|---|---|---|---|
| Mean | 0.00037 | 0.95 | 0.0243 | 0.0217 |
| Std. Dev | 0.00040 | 0.09 | 0.0148 | |
| Min | 0.00001 | 0.57 | 0.0041 | |
| Max | 0.00262 | 1 | 0.0886 | |

In addition, 12 SEM images of the AF 1055 and the PP 722 particles are also taken. The AF 1055 particle has a smooth surface with no visible pores, and the PP 722 particle is observed to have some roughened surfaces, but no obvious pores. Results of the pore sizes, therefore, are not presented.

Using the equations set forth above in the methods section, the pore surface area for organic polymeric particle 4 is determined. With 200 particles, a radius of 0.5515, and $c=\frac{2}{3}$, the total theoretical exterior surface area is about 97.3 $\mu m^2$. To determine the pore surface area, the mean area of the pores, as shown in Table 4 is multiplied by the number of pores, 1,876 to obtain a total pore surface area of about 8.87 $\mu m^2$. Thus, by dividing total theoretical exterior surface area (e.g., 97.3 $\mu m^2$) by the total pore surface area (e.g., 8.87 $\mu m^2$), the pore surface area for organic polymeric particle 4 is about 9 percent of the total theoretical exterior surface area.

Applying the same techniques to the values obtained for polymeric particle HS 3020 gives a pore surface area of about 0.7 percent of the total theoretical exterior surface area.

As such, it is shown that the organic polymeric particles of the present disclosure can be produced with pore surface areas greater than other polymeric particles.

What is claimed is:

1. A coated paper comprising:
   a base paper having a first and a second surface; and
   a paper coating composition applied to the first, the second, or both the first and second surfaces, where the paper coating composition comprises a binder and a hollow porous particle; and
   where the hollow porous particle was prepared by a process that includes
   (i) providing an organic polymeric particle including a core including a polymer including units deriving from the polymerization of acrylate monomer; and a shell surrounding the core, where the shell includes a polymer having units deriving from the polymerization of styrene monomer and acrylate monomer selected from methyl acrylate, butyl acrylate, and combinations thereof; where the shell includes polymer having from 70 to 98 weight units deriving from the polymerization of styrene monomer, and from 2 to 30 weight units deriving from the polymerization of acrylate monomer; and
   (ii) subjecting the organic polymeric particle to conditions that will hydrolyze the units deriving from the polymerization of acrylate monomer within the shell and the core, to thereby provide a hollow porous particle.

2. The coated paper of claim 1, where hollow porous particle has a void volume fraction of from 40 to 85 percent.

3. The coated paper of claim 1, where the hollow porous particle has a pore surface area greater than 1 percent of the total theoretical exterior surface.

4. The coated paper of claim 1, where the paper coating composition further comprises a pigment.

5. The coated paper of claim 1, where the pigment is an organic polymeric particle.

6. The coated paper of claim 4, where the pigment is an inorganic particle.

7. A method of preparing a coated paper comprising:
  (i) preparing a hollow porous particle by a process that includes:
    (a) providing an organic polymeric particle including a core including a polymer including units deriving from the polymerization of acrylate monomer; and a shell surrounding the core, where the shell includes a polymer having units deriving from the polymerization of styrene monomer and acrylate monomer selected from methyl acrylate, butyl acrylate, and combinations thereof; where the shell includes polymer having from 70 to 98 weight units deriving from the polymerization of styrene monomer, and from 2 to 30 weight units deriving from the polymerization of acrylate monomer;
    (b) subjecting the organic polymeric particle to conditions that will hydrolyze the units deriving from the polymerization of acrylate monomer within the shell and the core, to thereby provide a hollow porous particle;
  (ii) preparing a coating composition by combining the hollow porous particle and a binder; and
  (iii) coating a base paper having a first and a second surfaces on at least one of the first and second surfaces.

* * * * *